(12) United States Patent
Vix et al.

(10) Patent No.: US 10,877,608 B2
(45) Date of Patent: Dec. 29, 2020

(54) PARALLEL ACQUISITION AND MEASUREMENT OF CAPACITIVE SENSOR CHANNELS, AND RELATED SYSTEMS, METHODS, AND DEVICES

(71) Applicant: Microchip Technology Incorporated, Chandler, AZ (US)

(72) Inventors: Regis Vix, Loire A (FR); Rian Whelan, Tara (IE); Frederic Igier, Ste Luce sur Loire (IE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/014,969

(22) Filed: Jun. 21, 2018

(65) Prior Publication Data

US 2019/0391682 A1 Dec. 26, 2019

(51) Int. Cl.
*G06F 3/044* (2006.01)
*G06F 3/041* (2006.01)
*G06F 3/0488* (2013.01)

(52) U.S. Cl.
CPC .......... *G06F 3/044* (2013.01); *G06F 3/0446* (2019.05); *G06F 3/0418* (2013.01); *G06F 3/04886* (2013.01); *G06F 2203/04104* (2013.01)

(58) Field of Classification Search
CPC ...... G06F 3/044; G06F 3/0446; G06F 3/0418; G06F 3/04886; G06F 2203/014104; G06F 3/041; G06F 3/03; G06F 3/01; G06F 3/00; G06F 3/0416; G06F 3/0488; G06F 3/0487; G06F 3/048; G06F 2203/04103; G06F 2203/041; G06F 2203/00
See application file for complete search history.

(56) References Cited

U.S. PATENT DOCUMENTS

| 10,423,273 | B2* | 9/2019 | Leigh | G06F 3/041 |
| 2011/0084857 | A1* | 4/2011 | Marino | G06F 3/044 |
| | | | | 341/5 |
| 2012/0056841 | A1 | 3/2012 | Krenik et al. | |
| 2013/0021294 | A1* | 1/2013 | Maharyta | G06F 3/0416 |
| | | | | 345/174 |
| 2014/0035874 | A1 | 2/2014 | Iizuka | |
| 2014/0146009 | A1* | 5/2014 | Huang | G06F 3/044 |
| | | | | 345/174 |

(Continued)

FOREIGN PATENT DOCUMENTS

| EP | 2503433 A2 | 9/2012 |
| EP | 3015960 A1 | 5/2016 |
| JP | 2015-007912 A | 1/2015 |

OTHER PUBLICATIONS

International Search Report for International Application No. PCT/US2019/034216, dated Jul. 29, 2019, 5 pages.

(Continued)

*Primary Examiner* — Julie Anne Watko
(74) *Attorney, Agent, or Firm* — TraskBritt

(57) ABSTRACT

Embodiments of the disclosure relate, generally, to techniques for parallel acquisition and measurements and related circuits, systems and devices that implement those techniques. A technique for parallel acquisition and measurement generally includes simultaneously acquiring sensed signals from multiple sensor channels and determining channel capacitance measurements responsive to the sensed signals.

36 Claims, 7 Drawing Sheets

(56) References Cited

U.S. PATENT DOCUMENTS

| | | | | |
|---|---|---|---|---|
| 2014/0267140 A1* | 9/2014 | Leigh | ............... | G06F 3/044 |
| | | | | 345/174 |
| 2015/0015497 A1* | 1/2015 | Leigh | ............... | G06F 3/044 |
| | | | | 345/173 |
| 2015/0084926 A1* | 3/2015 | Krah | ............... | G06F 3/03545 |
| | | | | 345/174 |
| 2015/0193041 A1* | 7/2015 | Shepelev | ............... | G06F 3/044 |
| | | | | 345/174 |
| 2015/0301631 A1* | 10/2015 | Mirfakhraei | ............... | G06F 3/044 |
| | | | | 345/173 |
| 2016/0103525 A1* | 4/2016 | Snelgrove | ............... | G06F 3/044 |
| | | | | 345/174 |
| 2017/0024061 A1* | 1/2017 | Forlines | ............... | G06F 3/0448 |
| 2018/0095592 A1* | 4/2018 | Leigh | ............... | G06F 3/0416 |

OTHER PUBLICATIONS

International Written Opinion for International Application No. PCT/US2019/034216, dated Jul. 29, 2019, 11 pages.

\* cited by examiner (state of the art)

(state of the art)

PARALLEL ACQUISITION AND MEASUREMENT OF CAPACITIVE SENSOR CHANNELS, AND RELATED SYSTEMS, METHODS, AND DEVICES

TECHNICAL FIELD

Embodiments of the present disclosure relate, generally, to capacitive sensing and, more specifically, to parallel acquisition and measurement on multiple sense channels of a touch panel, and related systems, methods and devices.

BACKGROUND

A typical touch interface system may incorporate touch sensors (capacitive, resistive, etc.) that respond to an object in close proximity to, or physical contact with, a contact sensitive surface of the touch interface system. The responses may be captured and interpreted to infer information about the contact, including a location on the interface. Touchpads used with personal computers, including laptop computers and keyboards for tablets, often incorporate or operate in conjunction with a touch interface system. Displays often include touch screens that incorporate elements (typically at least the touch sensor) of a touch interface system to enable a user to interact with a graphical user interface (GUI) and/or computer applications. Examples of devices that incorporate a touch display include portable media players, televisions, smart phones, tablet computers, personal computers, and wearables such as smart watches, just to name a few. Further, control panels for automobiles, appliances (e.g., an oven, refrigerator, laundry machine, etc.), security systems, automatic teller machines (ATMs), residential environmental control systems, and industrial equipment may incorporate touch interface systems.

Displays, appliances, and moisture, by way of example, may introduce noise into a touch interface system, and noise coupling can cause unwanted mutual capacitance effects at the sensor and acquisition circuitry.

BRIEF SUMMARY

Some embodiments relate, generally, to a capacitive circuit system. The capacitive circuit system may include a sensor circuitry, an acquisition circuitry, and a digital logic circuitry. The sensor circuitry includes drive lines and sense lines. The acquisition circuitry is operatively coupled to the sense lines. The digital logic circuitry is configured to: provide groups of drive signals to an interface operatively coupled to the drive lines of the sensor circuitry. In one embodiment, the groups of drive signals comprise polarity changes and the groups of drive signals are associated with a number of drive lines; select active sense lines of the sensor circuitry. The digital logic circuitry is further configured to determine at least one channel capacitance of at least one active sense line responsive to one or more sample voltages and the polarity changes.

Some embodiments relate, generally, to a method of capacitive sensing. The method includes asserting, at a number of drive lines of a sensor circuitry, groups of drive signals comprising polarity changes; receiving sensed signals from active sense lines of the sensor circuitry while the groups of drive signals are asserted; generating one or more sample voltages indicative of to the sensed signals; and determining at least one channel capacitance measurement of at least one of the sense lines responsive to the one or more sample voltages.

Some embodiments relate, generally, to a digital controller. The digital controller includes a touch acquisition unit, and a touch processor. The touch processor, responsive to a sensed measurement indicative of sensed signals simultaneously acquired at the touch acquisition unit from active sense channels of a touch sensor, configured to: determine the relative contribution of each of the sensed signals to the sensed measurement; and identify a sensed signal of the sensed signals responsive to the determined relative contributions.

BRIEF DESCRIPTION OF THE DRAWINGS

The purpose and advantages of the various embodiments of the disclosure will be apparent to one of ordinary skill in the art from the detailed description in conjunction with the accompanying figures.

DETAILED DESCRIPTION

Figure 1:
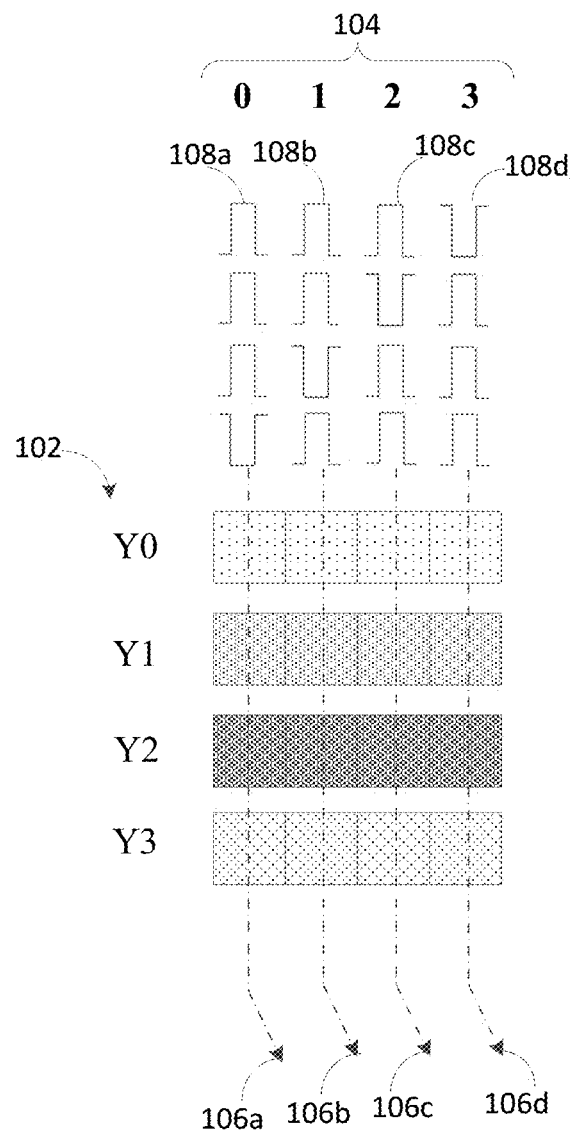
FIG. 1 shows a representation of parallel acquisition measurement, according to an embodiment of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As understood for purposes of the embodiments described in this disclosure, a touch sensor may respond to an object's (such as a finger or a stylus) contact with, or the object's proximity to, a contact-sensitive area of the contact sensor. In this disclosure "contact" and "touch" are meant to encompass both an object's physical contact with a contact-sensitive area and an object's presence within proximity of a contact-sensitive area without physical contact. Actual physical contact with a touch sensor is not required.

When an object contacts a capacitive touch sensor, a change in capacitance may occur within the touch sensor at or near the location of the contact. An analog touch acquisition front-end may "detect" the touch if it meets a certain threshold. "Charge-then-transfer" is a technique implemented in some touch-acquisition front-ends to measure capacitive changes, whereby a sensing capacitor is charged responsive to the change in capacitance and the charge is transferred to an integrating capacitor over multiple charge-transfer cycles. The amount of charge associated with such a charge-transfer may be converted to digital signals by an analog-to-digital converter (ADC), and a touch controller may process those digital signals to determine if an object contacted the sensor.

Self-capacitance sensors are capacitive field sensors that detect/respond to changes in capacitance to ground. They are typically laid out in an array of rows and columns that react independently to a touch. By way of non-limiting example, a self-capacitive sensor may include a circuit employing repetitive charge-then-transfer cycles using common integrated CMOS push-pull driver circuitry having floating terminals.

Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance techniques may be used in the same touch interface, and complimentary to each other, for example, self-capacitance may be used to confirm a touch detected using a mutual capacitance.

Touch sensors may be overlaid in a two-dimensional (2D) arrangement for a 2D contact-sensitive surface that may be incorporated into a contact sensitive surface—for example, of a touch pad or a display screen—and may facilitate user interaction with an associated appliance. Insulating protective layers (e.g., resins, glass, plastic, etc.) may be used to cover touch sensors. As used herein, a "touch display" or "touch panel" is a display (such as a liquid crystal display (LCD), thin-film transistor (TFT) LCD, or a light-emitting diode (LED) display that incorporate 2D touch sensors.

Using the example of a touch screen that uses a matrix sensor approach of mutual capacitance sensors employing charge-transfer techniques, drive electrodes may extend in rows on one side of a substrate and sense electrodes may extend in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately or both measured in response to a capacitive change indicative of a touch event. For example, if a drive signal is applied to the drive electrode of row 2 and a sense electrode of column 3 is active then the node position is: (row 2, column 3). Nodes may be scanned by sequencing through different combinations of drive and sense electrodes. In one mode the drive electrodes may be driven sequentially while the sense electrodes are all continuously monitored. In another mode each sense electrode may be sampled sequentially.

By way of non-limiting example, microcontrollers, digital logic circuits, and/or configurable state machines may be implemented to control the drive electrodes and analyze the capacitive effects on the touch sensor. Integrated Circuit (IC) packages that include a microcontroller may provide the input and output pins to communicate with a host; as well as the firmware to perform techniques and operations, including those described herein, in connection with various embodiments. Commercially available microcontrollers that may be used with the various embodiments of this disclosure may include, for example, peripheral interface microcontrollers, ARM-based microcontrollers, AVR-8 and 32-bit microcontrollers, and the like.

By way of example, sense electrodes of a touch sensor may be operatively coupled to a touch acquisition front-end (for example, a charge integrator) by way of device I/O pins of a touch controller. A digital controller of a touch controller may be coupled to the touch acquisition front-end by way of ADC/DAC pins. A digital controller may include, for example, a state machine (a collection of adders, flip-flops, and multiplexers) configured to identify a touch and information about a touch.

In this disclosure, "active channels" means a group of simultaneously or near-simultaneously enabled sense channels, for example, by a switch circuit that allows charge to flow to a charge integrator. One channel of a group of active channels may be referred to, individually, herein as "an active channel." During parallel acquisition, active channels may be consecutive (i.e., adjacent), non-consecutive (i.e., not every active channel is adjacent to another active channel), or a combination of consecutive and non-consecutive.

In this disclosure, "polarity code" means specific polarity changes of signals simultaneously or near simultaneously asserted at a group of drive channels as part of a parallel acquisition. In one embodiment, the polarity changes may consist of "high" signals (or a "1") and "low" signals (or a "0"). A "high" signal indicates a polarity change from low to high (e.g., about 0 to about 5 volts), and a "low" indicates a polarity change from high to low (about 5 to about 0 volts). A polarity code may indicate any number of polarity changes. By way of example, a polarity code may be represented as a high, low, low, low or [1, 0 0, 0].

Figure 7A:
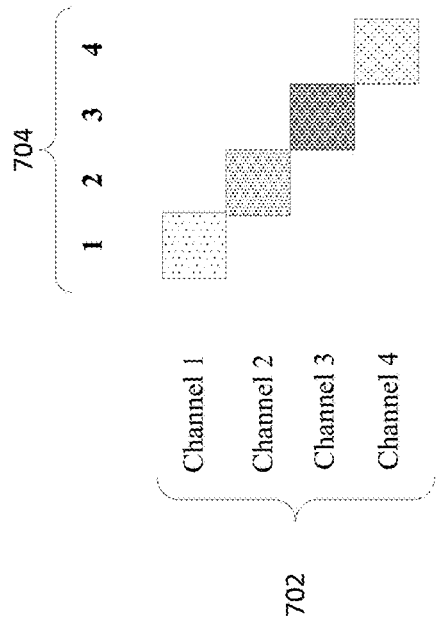
FIGS. 7A and 7B show measurement acquisition processes according to the state of the art.

A conventional technique, known to the inventors of this disclosure, for measuring the capacitance of a sensor channel is to proceed channel by channel, as shown in FIG. 7A. Measurements are taken one sense channel at a time for each of the channels 702, sequentially, with each cycle 704. So, channel 1 is measured at cycle 1, channel 2 is measured at cycle 2, channel 3 is measured at cycle 3, and channel 4 is measured at cycle 4. Channel-by-channel measurement is fast (4 channels in 4 cycles), but there is little noise tolerance built into the measurement process, itself.

Figure 7B:
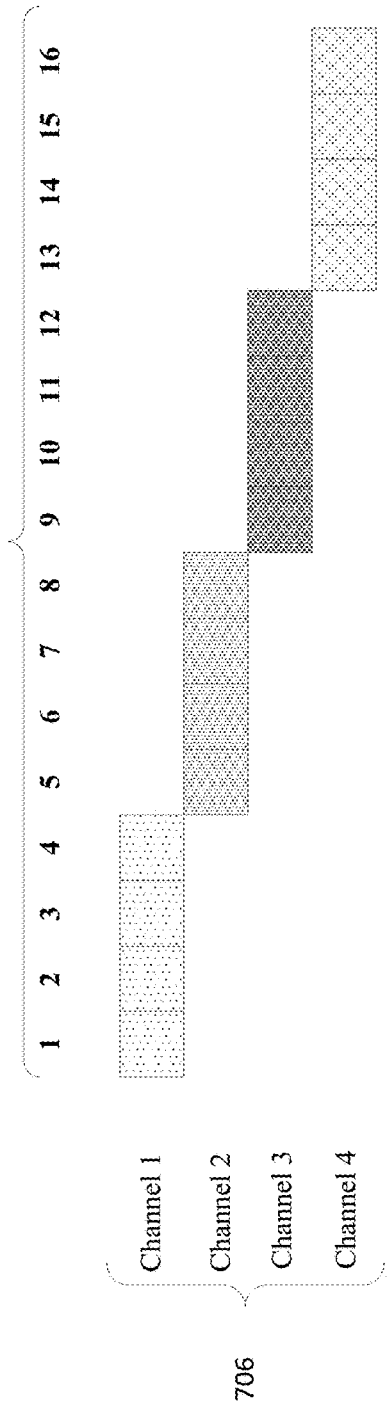

One technique to improve noise tolerance is to take and average multiple measurements from each channel, as shown in FIG. 7B. So, channel 1 is measured 4 times, channel 2 is measured 4 times, and so on. Averaging N measurements per channel, for Gaussian distributed noise, results in a $\sqrt{N}$ improvement in SNR for each channel as compared to the technique shown in FIG. 7A. However, as shown in FIG. 7B, the measurements are still taken sequentially (i.e., proceeding channel by channel), and so the acquisition speed is slower than techniques that do not use averaging. Notably, FIG. 7B shows acquisition from 4 channels 706 in 16 cycles 708 as compared to acquisition from 4 channels in 4 cycles shown in FIG. 7A. Such a long acquisition period reduces the refresh rate, and, therefore, would reduce a touch panel's parsing speed as compared to the channel-by-channel technique shown in FIG. 7A.

One or more embodiments of this disclosure relates to parallel acquisition and channel capacitance measurement. "Parallel acquisition" means acquisition, by analog circuitry and/or digital logic, of a measurable signal (analog or digital) indicative of sensed signals from two or more sense channels of a capacitive sensor. The sensed signals may be, for example, charge flow from sense channels of a capacitive sensor to a sampling circuit. A measurable signal may be a voltage, a current, a resistance, a capacitance, or combinations thereof. For example, using the case of a voltage, the acquired voltage may be indicative of charge flow, which in turn, may be indicative of channel capacitances between sense channels and drive channels. In various embodiments, digital logic may be configured to determine values for the channel capacitance responsive to a voltage at an output (which, when discretized, may be characterized as a "sample voltage") by a charge-to-voltage converter.

As used herein, "channel capacitance measurement" means any value related to mutual capacitance of a channel including, without limitation, absolute measurements of channel capacitance and change in capacitance.

Some embodiments of the disclosure relate, generally, to parallel acquisition from two or more active sense channels of a touch sensor. One advantage of parallel acquisition is that it decouples, to varying degrees, the tradeoff between parsing speed and the SNR. In other words, given a single channel acquisition system having a signal-to-noise-ratio of $SNR_1$, an N-channel acquisition system according to embodiments of the disclosure will have a signal-to-noise-ratio of $SNR_N = \sqrt{N} \times SNR_1$. Thus, the signal-to-noise-ratio of an embodiment of an 8-channel acquisition system will have an SNR of $2\sqrt{2} \times SNR_1$, relative to a single channel acquisition system, but without a corresponding drop in parsing speed.

Moreover, a system that incorporates parallel acquisition techniques described herein, may achieve the same SNR performance as a single channel acquisition system, but with half the number of channels. For example, a touch panel with a 6-inch diagonal and 400 channels that incorporates embodiments of 4-channel parallel acquisition may achieve the same parse speed and SNR as a touch panel with a 3-inch diagonal and 100 channels that incorporates single channel measurement acquisition.

While some embodiments are described with reference to specific numbers of channels (e.g., 4, 8, etc.) used in parallel acquisition or parallel acquisition measurements, one of ordinary skill in the art would recognize that the disclosure is not limited to a specific architectures, and may be used with two or more active channels. Moreover, both odd and even numbers of channels may be used. In some applications that implement embodiments of the disclosure, the specific number of channels may be dictated by design considerations, for example, the desired size of a contact-sensitive surface, parsing speed requirements, and SNR requirements. All combinations and numbers of active channels are specifically contemplated for this disclosure.

Embodiments of the disclosure also relate to channel-by-channel polarity control, which facilitates channel capacitance measurement. In one embodiment, a digital controller changes the drive polarity of drive lines of a capacitive sensor, individually, according to a polarity code, which "modifies" a contribution of each active channel compared to the other active channels. As described in more detail, below, according to the superimposition principle, the acquired signals from a group of active channels may be converted to a single channel measurement with a capacitance equal to the sum of the channel capacitances of the active channels. Notably, the choice of the polarity code affects the relative polarity asserted on each drive channel for each parallel acquisition. Choice of polarity code facilitates mathematical reconstruction of the input of each individual sense channel after a number of single parallel acquisitions equal to the number of channels.

In one embodiment, the polarity codes for parallel acquisition are orthogonal in order to permit better differentiation of the contributing active channels. In other words, if there are three polarity codes, each polarity code is orthogonal to the other two polarity codes. In another embodiment, the number of polarity codes used for a parallel acquisition and to determine a parallel acquisition measurement should be same as the number of active channels.

FIG. 1 shows a representation of parallel acquisition, according to an embodiment of the disclosure. In this example, the signals from four active channels corresponding to sense electrode pads Y0, Y1, Y2, and Y3, are sampled simultaneously (i.e., during the same acquisition cycle). Active channels 102 are shown in FIG. 1, at which signals 106a to 106d are sampled while the polarity codes 108a, 108b, 108c, and 108d are asserted at drive lines at cycles 104 of 0, 1, 2, and 3, respectively.

Figure 2:
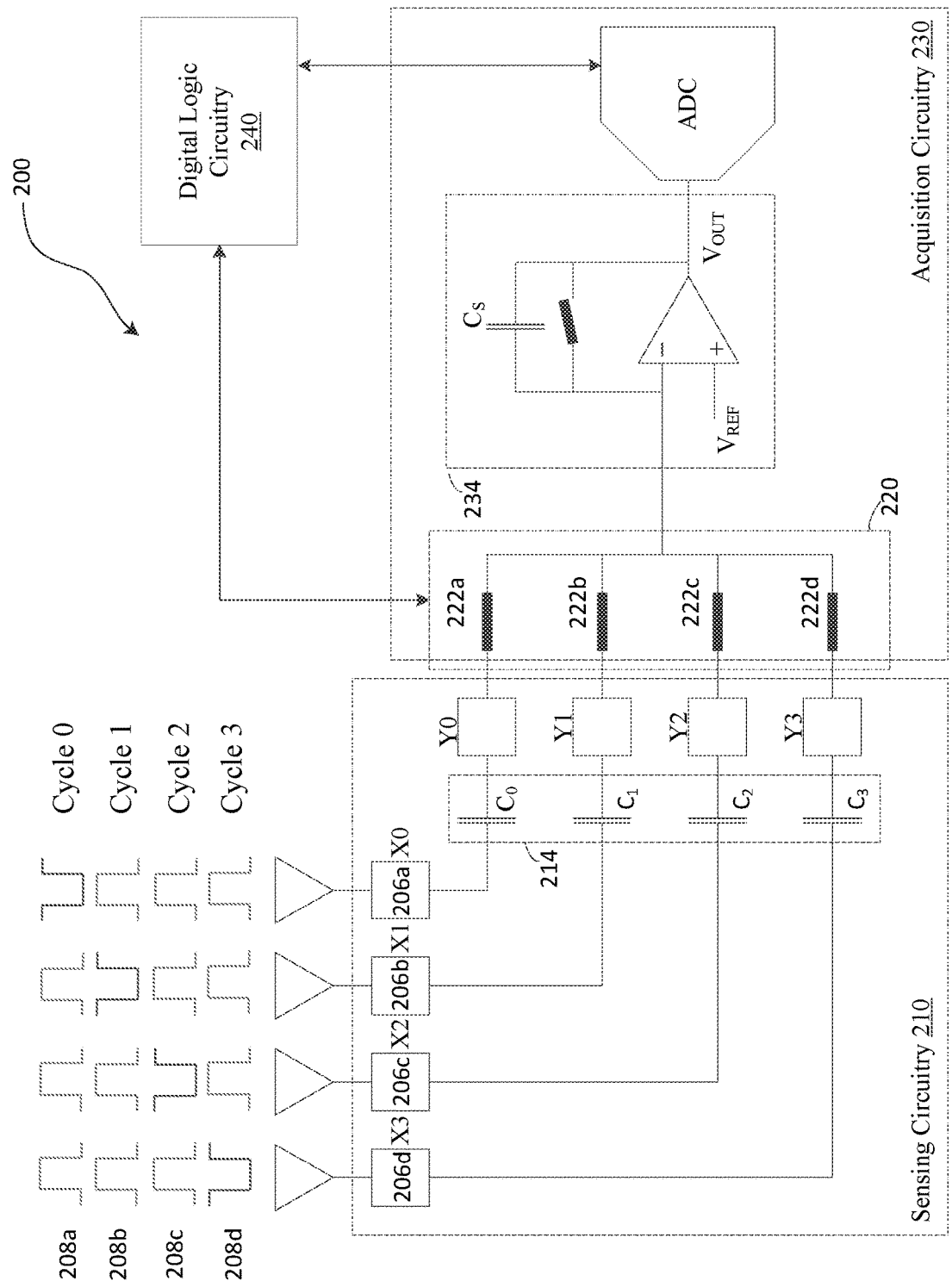
FIG. 2 shows a parallel acquisition measurement circuit for use with touch panel applications, according to an embodiment of the disclosure.

FIG. 2 shows a parallel acquisition and measurement circuit 200 for use with touch panel applications, according to an embodiment of the disclosure. The measurement circuit 200 includes sensing circuitry 210 and acquisition circuitry 230, arranged for mutual capacitance sensing. The acquisition circuitry 230 is operatively coupled to the sensing circuitry 210 by selection circuitry 220. The selection circuitry 220 includes switches 222a-222d. In one embodiment, the selection switches 222a-222d may be opened or closed to enable accumulation of charges from an active sense channel. The selection switches 222a-222d may be, for example, capacitive switches, bipolar-junction-transistors (BJTs), metal oxide semiconductor field effect transistors (MOSFETS), insulated gate bipolar transistors, and diodes. Any number of the sense channels may be enabled by the selection circuitry 220, although, in one embodiment, two or more of the selection switches 222a-222d may be enabled for parallel acquisition and measurement.

In FIG. 2, selection switches 222a-222d are configured to enable/disable up to four channel parallel acquisition and measurement. At cycles 0, 1, 2, and 3, polarities 208a, 208b, 208c, and 208d are asserted at drive lines 206a-206d. Acquisition circuitry 230 is configured to sample the four selected channels of the sensing circuitry 210, and the digital logic circuitry 240 is configured to determine values for the channel capacitances 214 (here, $C_0$, $C_1$, $C_2$ and $C_3$) across one or more of the corresponding drive electrodes X3-X0 and sense electrodes Y3-Y0.

The acquisition circuitry 230 shown in FIG. 2 may include a charge-to-voltage converter 234 that is configured to integrate charge from the active channels at a sampling capacitor ($C_s$) and output a voltage sample ($V_{OUT}$) that is indicative of the charge contribution of all of the active channels, and, consequently a channel capacitance equal to the sum of the channel capacitance of the active channels. As noted, above, according to the superimposition principle, the four active channels are converted at the same time to a single channel $V_{OUT}$. The capacitive contribution of each sense channel may be determined from the summed channel capacitances. In one embodiment, the logic for converting and determining may be implemented at the digital logic circuitry 240. In one embodiment, the digital logic circuitry 240 may be a digital logic circuit configured to implement one or more aspects of the embodiments for parallel acquisition and channel capacitance measurement described herein. In one embodiment, the digital logic circuitry 240 may be a configurable state machine (e.g., adders, multiplexers, flip-flops).

$V_{OUT}$ may be described according to Equation 1:

$$V_{OUT} = V_{DD} \frac{C_{xy}}{C_S} + V_{REF} \qquad \text{Equation 1}$$

$C_S$ is the sampling capacitance of the charge-to-voltage converter 234. $C_{XY}$ is the external capacitance across drive electrodes X and sense electrodes Y (i.e., the entire channel capacitance seen by the charge-to-voltage converter 234). Charge flowing between the voltage converter 234 and $C_{XY}$ is integrated into $C_s$. Equation 1 may be expressed in terms of the sum of the channel capacitances that comprise $C_{XY}$. The asserted polarities 208a-208d modify the contribution of each channel capacitances in a "known way." For example, using the convention of the polarities 208a-208d, a drive channel with the "low-to-high" polarity contributes more to a capacitance measurement than drive channels with the "high-to-low" polarity change. Using the convention of the polarity changes described, above, the channel capacitance affected by the high-to-low polarity is reflected as a negative capacitance in Equations 2, 3, 4, and 5:

$$V_0 = V_{DD} \cdot \frac{-C_0 + C_1 + C_2 + C_3}{C_S} + V_{REF} \qquad \text{Equation 2}$$

-continued $$V_1 = V_{DD} \cdot \frac{+C_0 - C_1 + C_2 + C_3}{C_S} + V_{REF} \qquad \text{Equation 3}$$

$$V_2 = V_{DD} \cdot \frac{+C_0 + C_1 - C_2 + C_3}{C_S} + V_{REF} \qquad \text{Equation 4}$$

$$V_3 = V_{DD} \cdot \frac{+C_0 + C_1 + C_2 - C_3}{C_S} + V_{REF} \qquad \text{Equation 5}$$

Equations 2, 3, 4 and 5 may be re-written as Equations 6, 7, 8, and 9, respectively, to solve for $C_0$, $C_1$, $C_2$, and $C_3$, as follows:

$$C_0 = \frac{C_S}{4 \cdot V_{DD}}(-V_0 + V_1 + V_2 + V_3) + \frac{V_{REF}}{V_{DD}} \cdot C_S \qquad \text{Equation 6}$$

$$C_1 = \frac{C_S}{4 \cdot V_{DD}}(+V_0 - V_1 + V_2 + V_3) + \frac{V_{REF}}{V_{DD}} \cdot C_S \qquad \text{Equation 7}$$

$$C_2 = \frac{C_S}{4 \cdot V_{DD}}(+V_0 + V_1 - V_2 + V_3) + \frac{V_{REF}}{V_{DD}} \cdot C_S \qquad \text{Equation 8}$$

$$C_3 = \frac{C_S}{4 \cdot V_{DD}}(+V_0 + V_1 + V_2 - V_3) + \frac{V_{REF}}{V_{DD}} \cdot C_S \qquad \text{Equation 9}$$

Determining values for the individual channel capacitances $C_0$, $C_1$, $C_2$ and $C_3$ of channel capacitances 214 then becomes a system of equations problem, with N unknowns (notably, N is the number of active channels, the number of parallel acquisitions, and the number of channel capacitance values that can be determined) that the digital logic circuitry 240 is configured to solve.

Notably, the parallel acquisition and measurement circuit 200 includes a single front-end acquisition circuitry 230. Another approach to implementation of embodiments of the disclosure is to use multiple-front-end acquisition circuits, for example, using a front-end acquisition circuit with each active channel. This other embodiment of using multiple-front-end acquisition circuits may be beneficial in applications where the trade-off in terms of silicon and power compared to using a single front-end acquisition circuit or a ratio (e.g., one front-end for every 10 channels, 20 channels, etc.) is acceptable.

Figure 3:
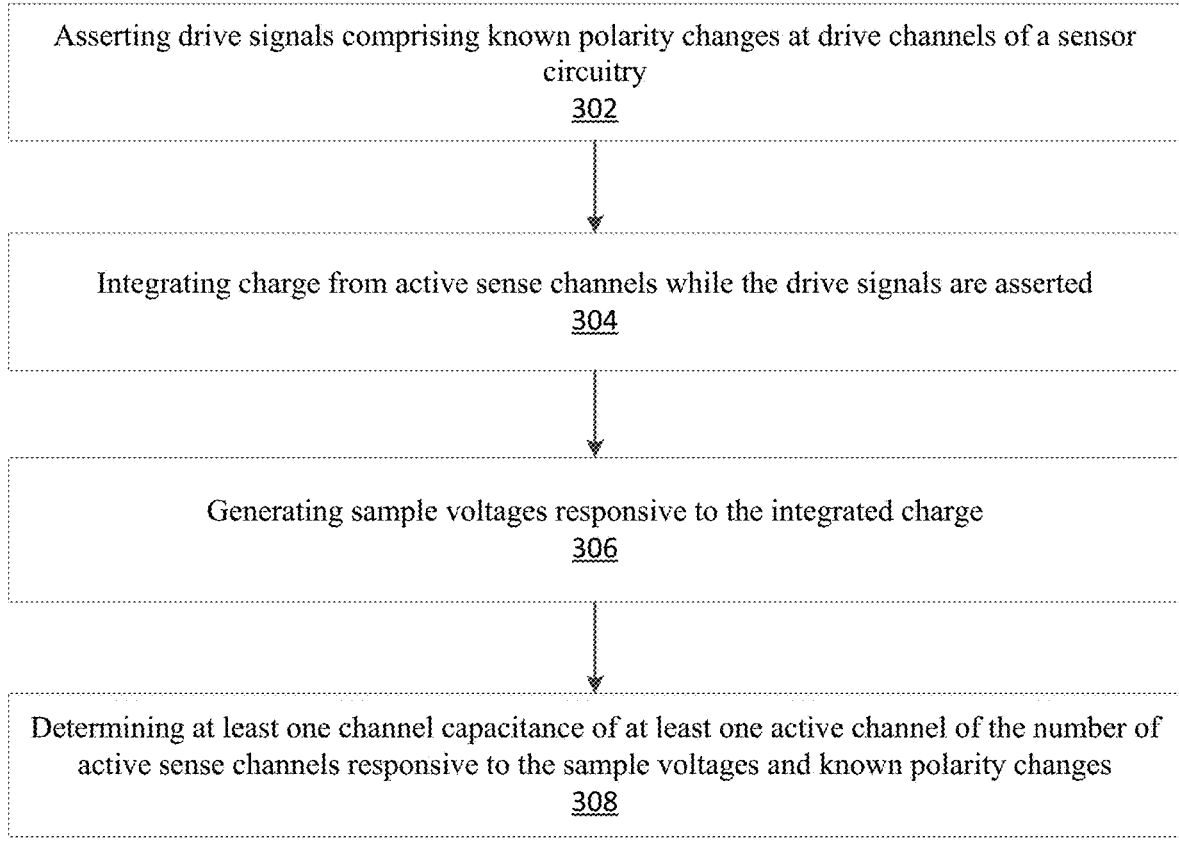
FIG. 3 is a flowchart of a parallel acquisition method according to an embodiment of the disclosure.

FIG. 3 shows a process for parallel acquisition and channel capacitance measurement, according to an embodiment of the disclosure. In operation 302, drive signals are asserted at drive channels of a sensor circuitry. The drive signals comprise known polarity changes. The number of known polarity changes may be proportional to the number of acquisition cycles over which the drive signals are asserted (e.g., two polarity changes for each acquisition cycle). In operation 304, charge is integrated from active sense channels while the drive signals are asserted. In one embodiment, charge is integrated from two or more active sense channels. In operation 306, one or more sample voltages are generated responsive to the integrated charge. In one embodiment, a sample voltage is generated for each acquisition cycle. In operation 308, at least one channel capacitance of at least one active channel of the number of active sense channels is determined responsive to the one or more sample voltages and known polarity changes. Multiple channel capacitances up to the number of active channels may be determined responsive to the one or more sample voltages and the known polarity changes.

While the embodiments described, above, relate to determining channel capacitance measurement using parallel acquisition, generally, one of ordinary skill in the art would understand that the principles of this disclosure are extendable to determining values for changes in channel capacitance. For example, the charge-to-voltage converter 234 may be modified to include a compensation circuit (e.g., a compensation capacitor) such that the resulting circuit is configured to integrate charge responsive to changes in channel capacitance. Thus, the embodiments of the disclosure are extendible based on different capacitive sensor applications and design requirements.

Figure 4:
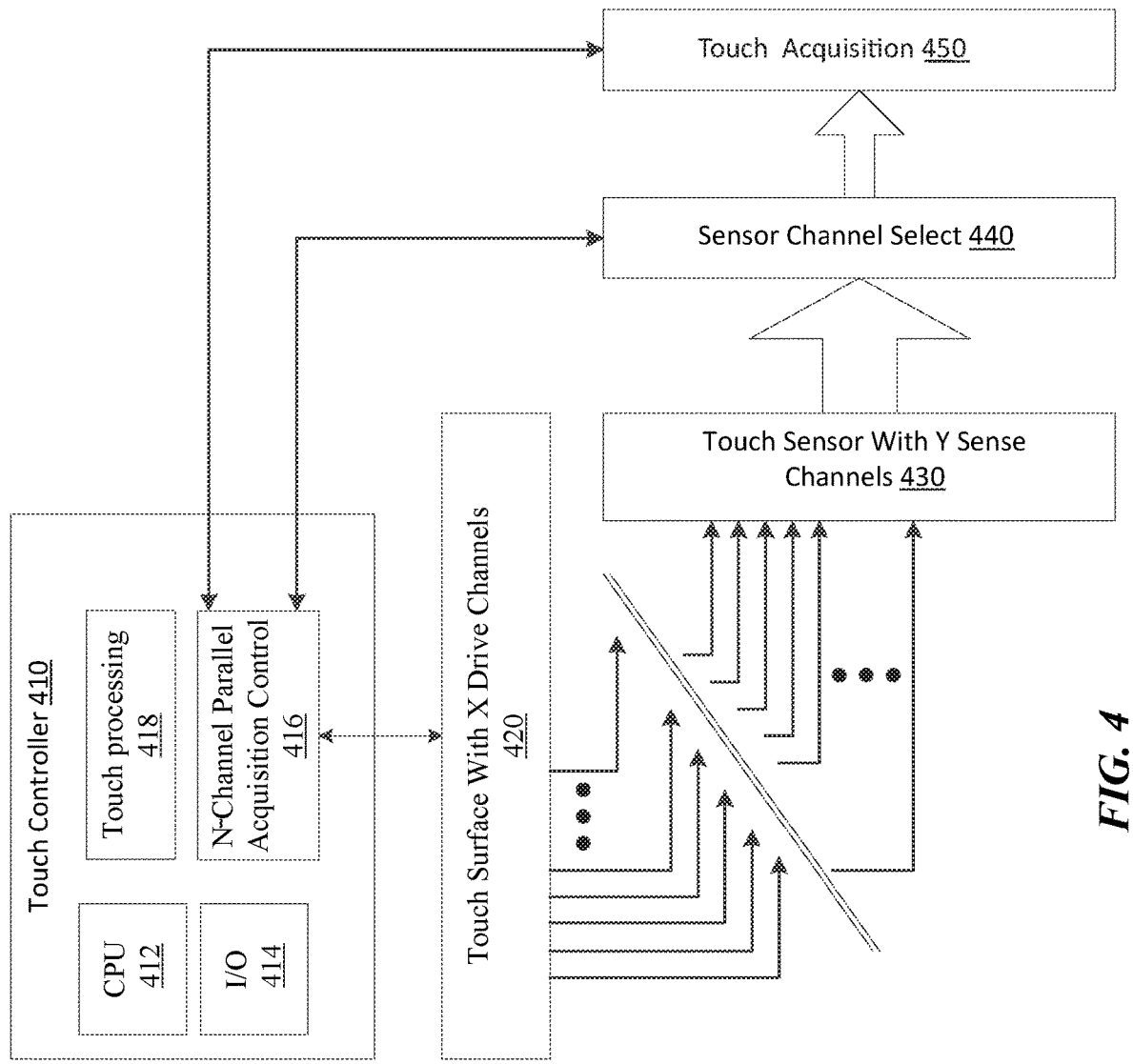
FIG. 4 shows a system diagram of a touch panel that incorporates the principles of parallel acquisition measurement, according to an embodiment of the disclosure.

FIG. 4 shows a system diagram of a touch panel that incorporates the principles of parallel acquisition and channel capacitance measurement, according to an embodiment of the disclosure. A touch controller 410 is operatively coupled to a touch surface 420 with drive channels. The touch controller 410 may include a CPU 412, input/output (I/O) 414, N-channel parallel acquisition control 416, and touch processing 418. By way of example, the touch surface 420 may be a touch screen, a touch pad, or a number of touch buttons. An N-channel parallel acquisition control 416 of the touch controller 410 may be configured to determine and/or provide drive signals (or control signals for drivers of drive channels) responsive to one or more polarity codes to the drive channels to assert polarity changes corresponding to polarity codes. In one embodiment, the touch controller 410 may be configured to provide one or more control signals responsive to the polarity codes to an interface that is configured to assert the polarity changes of the drive signals. In one embodiment, the polarity codes may be digital signals stored in a memory (e.g., registers or ROM), associated with the touch controller 410. In another embodiment, the polarity codes may be implemented as a digital logic circuit that is activated by the touch controller 410.

The touch controller 410 may also be operatively coupled to sensor channel select 440, and while the touch controller 410 asserts the polarity changes at the drive channels it also enables a corresponding group of active sense channels by way of the sensor channel select 440. Touch acquisition 450 receives the sensor signals from the active sensor channels and provides sample signals to the touch controller 410. In one embodiment, a compensation capacitor Cc in the touch acquisition front-end that is configured for parallel acquisition may be tuned for baseline capacitance so that $V_{OUT}$ is mid-rail, e.g., $V_{OUT} = \frac{1}{2} V_{DD}$.

The N-channel parallel acquisition control 416 is configured to perform any conversion and reconstruction necessary to determine measurement values, for example, for channel capacitance or change in channel capacitance. Touch processing 418 may be configured to use the measurement values, for example, to determine touch information responsive to the measurement values.

Depending on the application, the touch controller 410 may provide one or more results from N-channel parallel acquisition control 416 to an external host (not shown). In one embodiment, the results may be indicative of a location (e.g., X, Y location, pixel location, etc.) of a touch at the touch surface 420. In one embodiment, the touch controller may provide digital measurement values to an interface operatively coupled to a data bus, for example, universal asynchronous receiver-transmitter (UART), universal synchronous/asynchronous receiver-transmitter USART, or inter-integrated circuit ($I^2C$). In one embodiment, the data bus may be a peripheral data bus operatively coupled to a microcontroller, and one or more of the touch controller 410 and touch acquisition 450 may be part of an integrated circuit package together with the microcontroller.

Figure 5:
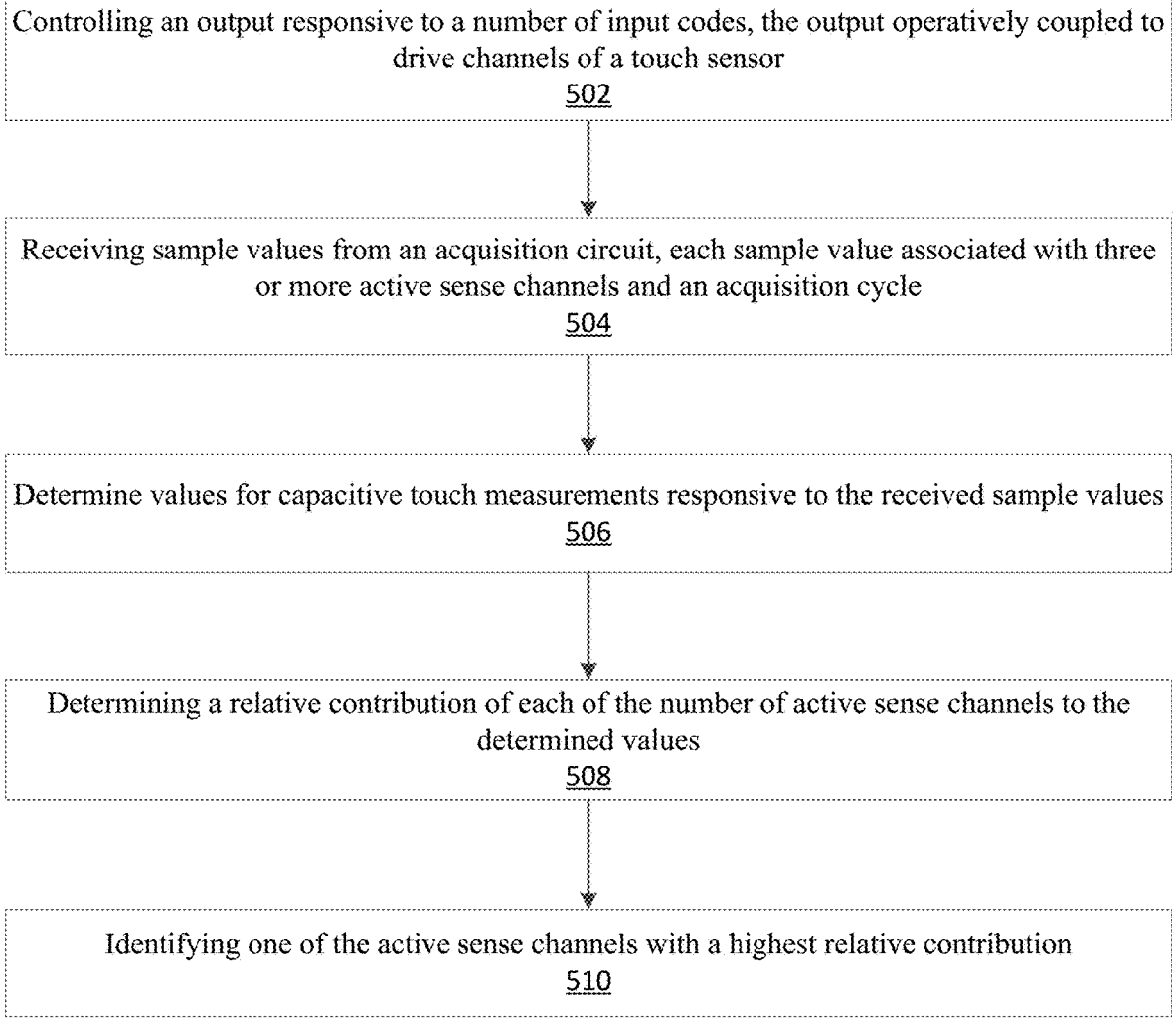
FIG. 5 shows a flowchart of a parallel acquisition measurement process, according to an embodiment of the disclosure.

FIG. 5 shows a parallel acquisition and measurement process performed at a touch controller 410, according to an embodiment of the disclosure. In operation 502, an output is controlled responsive to a number of polarity codes. The output is operatively coupled to drive channels of a touch sensor 430. In operation 504, a number of sample values are received from an acquisition circuit. In one embodiment, the sample values are sample voltages generated at a charge-integrator of the touch acquisition 450. Each sample value may be associated with one or more of two or more active sense channels, an acquisition cycle, and an polarity code. In operation 506, values for capacitive touch measurements are determined responsive to the received sample values. In one embodiment, the values are indicative of channel capacitances of the two or more active sense channels and drive channels. In operation 508, a relative contribution is determined of each of the number of active sense channels to the determined values. In operation 510, an active sense channel with a highest relative contribution is identified responsive to the comparison. The process may be repeated until the sensor channels having the highest contribution or a contribution above a threshold have been determined.

Notably, in a sense operation of a touch panel, several groups of sensed channels may be acquired in parallel before the sense operation completes. For example, if a sensor has 100 sense channels and 4 channels are acquired in parallel with each acquisition cycle, then, it will take four acquisition cycles to complete a parallel acquisition operation for the four channels, and 25 parallel acquisition operations to complete the sense operation for the touch panel, for a total of 100 acquisition cycles to complete the sense operation.

Figure 6:
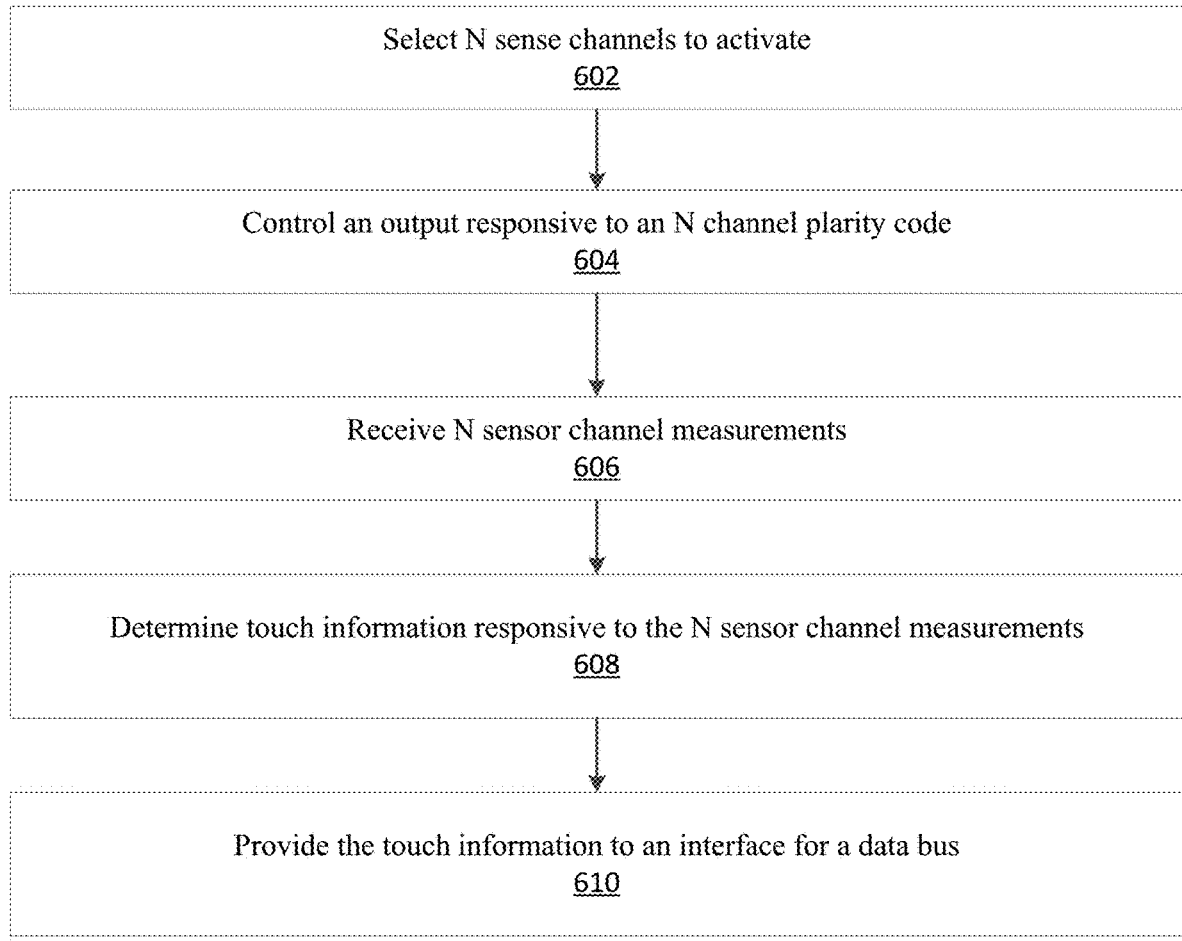
FIG. 6 shows a flowchart of a touch processing process that implements parallel acquisition measurement techniques according to embodiments of the disclosure.

FIG. 6 shows a touch processing process, according to an embodiment of the disclosure. In operation 602, N sense channels of a touch sensor are selected. In operation 604, an output is controlled responsive to an polarity code. In one embodiment, the polarity code is an N-channel polarity code and it corresponds to drive channels of a touch sensor. Each channel of the N-channel polarity code may correspond to consecutive (i.e., adjacent) drive channels, or may correspond to one or more non-consecutive (i.e., not adjacent) drive channels. The N-channel polarity code may also indicate a number codes for a number of acquisition cycles as well an order according to which the codes should be asserted. For example, a code of low, low, low, low, high followed by a code of low, low, high, low, may indicate codes for a first acquisition cycle and a second acquisition cycle, respectively. In operation 606, N sensor channel measurements are received. The N sensor channel measurements may be received over N acquisition cycles. In operation 608, one or more touch information are determined responsive to the N sensor channel measurements. In one embodiment, the touch information may be indicative of a location of a touch or a series of touches (e.g., a finger or stylus sliding across a contact sensitive surface). In operation 610, the touch information may be provided to an interface for a data bus.

One of ordinary skill in the art will appreciate that embodiments of the disclosure may be applied to more than converting change in capacitance to voltage, for example, the same principles apply to using change in charge to determine frequency and change in charge to determine current. Thus, embodiments of the present disclosure are not limited to touch controllers that measure voltage to detect contact, but also apply to touch controllers that measure frequency and current (or changes in frequency and/or current).

One of ordinary skill in the art will recognize that embodiments of the disclosure have many benefits and advantages in addition to overcoming deficiencies of some conventional acquisition techniques. For example, speed gain and therefore ability to parse larger panels within the same time constraints; a signal-to-noise ratio gain and therefore operating at the same speed achieved with single channel acquisition but higher noise immunity; and power saving gain because operating faster allows use of a device for shorter periods and less power consumption over time.

Many of the functional descriptions in this specification may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

Additional non-limiting embodiments of the disclosure include:

Embodiment 1

A capacitive circuit system, comprising: a sensor circuitry comprising drive lines and sense lines; an acquisition circuitry operatively coupled to the sense lines; and a digital logic circuitry configured to: provide groups of drive signals to an interface operatively coupled to the drive lines of the sensor circuitry, wherein the groups of drive signals comprise polarity changes and the groups of drive signals are associated with a number of drive lines; select active sense lines of the sensor circuitry; and determine at least one channel capacitance of at least one active sense line responsive to one or more sample voltages and the polarity changes.

Embodiment 2

The capacitive circuit system of Embodiment 1, wherein the digital logic circuitry is configured to provide the groups of drive signals for a number of acquisition cycles.

Embodiment 3

The capacitive circuit system of any of Embodiment 1 or 2, wherein each group of the groups of drive signals is associated with a different acquisition cycle of the number of acquisition cycles.

Embodiment 4

The capacitive circuit system of any of Embodiments 1 to 3, wherein each of the polarity changes is selected from the group consisting of a low-to-high signal change and a high-to-low signal change.

Embodiment 5

The capacitive circuit system of any of Embodiments 1 to 4, wherein a first group of drive signals associated with a first acquisition cycle comprises first drive signals, and one drive signal of the first drive signals comprises a first polarity change and all other drive signals of the first drive signals comprise a second polarity change.

Embodiment 6

The capacitive circuit system of any of Embodiments 1 to 5, wherein the one drive signal of the first group of drive signals is associated with a first drive line of the number of drive lines.

Embodiment 7

The capacitive circuit system of any of Embodiments 1 to 6, wherein a second group of drive signals associated with a second acquisition cycle comprises second drive signals, and one drive signal of the second drive signals comprises the first polarity change and all other drive signals of the drive signals comprise the second polarity change.

Embodiment 8

The capacitive circuit system of any of Embodiments 1 to 7, wherein the one drive signal of the second drive signals is associated with a second drive line of the number of drive lines.

Embodiment 9

The capacitive circuit system of any of Embodiments 1 to 8, wherein the first acquisition cycle and the second acquisition cycle are consecutive.

Embodiment 10

The capacitive circuit system of any of Embodiments 1 to 9, wherein the number of drive lines is a subset of the drive lines of the sensing circuitry.

Embodiment 11

The capacitive circuit system of any of Embodiments 1 to 10, wherein the number of drive lines is all of the drive lines of the sensing circuitry.

Embodiment 12

The capacitive circuit system of any of Embodiments 1 to 11, wherein a number of groups of drive signals is equal to a number of acquisition cycles over which the one or more sample voltages are received.

Embodiment 13

The capacitive circuit system of any of Embodiments 1 to 12, further comprising selection circuitry configured to selectively couple selected sense lines to the acquisition circuitry responsive to the selection by the digital logic circuitry.

Embodiment 14

The capacitive circuit system of any of Embodiment 1 to 13, further comprising selection circuitry, wherein the selection circuitry further comprises switches configured for selectively coupling, wherein the switches are selected from the group consisting of bipolar-junction-transistors, diodes, capacitive switches, metal oxide semiconductor field effect transistors, and insulated gate bipolar transistors.

Embodiment 15

The capacitive circuit system of any of Embodiments 1 to 14, wherein the acquisition circuitry comprises charge-to-voltage converter circuitry.

Embodiment 16

The capacitive circuit system of any of Embodiments 1 to 15, wherein the at least one channel capacitance is a channel capacitance measurement of the at least one channel.

Embodiment 17

A method of capacitive sensing, comprising: asserting, at a number of drive lines of a sensor circuitry, groups of drive signals comprising polarity changes; receiving sensed signals from active sense lines of the sensor circuitry while the groups of drive signals are asserted; generating one or more sample voltages indicative of to the sensed signals; and determining at least one channel capacitance measurement of at least one of the sense lines responsive to the one or more sample voltages.

Embodiment 18

The method of Embodiment 17, further comprising asserting the groups of drive signals over a number of acquisition cycles.

Embodiment 19

The method of any of Embodiments 17 or 18, further comprising asserting each group of the groups of drive signals a different acquisition cycle of the number of acquisition cycles.

Embodiment 20

The method of any of Embodiments 17 to 19, wherein each of the polarity changes is selected from a group consisting of a low-to-high signal change and a high-to-low signal change.

Embodiment 21

The method of any of Embodiments 17 to 20, further comprising asserting first drive signals during a first acquisition cycle, wherein one drive signal of the first drive signals comprises a first polarity change and all other drive signals of the drive signals comprise a second polarity change.

Embodiment 22

The method of any of Embodiments 17 to 21, further comprising asserting the one drive signal of the first drive signals at a first drive line of the number of drive lines.

Embodiment 23

The method of any of Embodiments 17 to 22, further comprising asserting second drive signals during a second acquisition cycle, wherein one drive signal of the second drive signals comprises the first polarity change and all other drive signals of the drive signals comprise the second polarity change.

Embodiment 24

The method of any of Embodiments 17 to 23, wherein the one drive signal of the second drive signals is asserted at a second drive line of the number of drive lines.

Embodiment 25

The method of any of Embodiments 17 to 24, wherein the first acquisition cycle and the second acquisition cycle are consecutive.

Embodiment 26

The method of any of Embodiments 17 to 25, further comprising asserting the groups of drive signals at a subset of the number of drive lines of the sensing circuitry.

Embodiment 27

The method of any of Embodiments 17 to 26, further comprising asserting the groups of drive signals at all of the number of drive lines of the sensing circuitry.

Embodiment 28

The method of any of Embodiments 17 to 27, further comprising asserting drive signals of all of the groups over an equal number of acquisition cycles.

Embodiment 29

The method of any of Embodiments 17 to 28, further comprising selectively coupling selected sense lines to an acquisition circuitry.

Embodiment 30

The method of any of Embodiments of any of embodiments 17 to 29, further comprising selectively enabling or disabling switches to selectively couple the selected sense lines to the acquisition circuitry, wherein the switches are selected from the group consisting of bipolar-junction-transistors, diodes, capacitive switches, metal oxide semiconductor field effect transistors, and insulated gate bipolar transistors.

Embodiment 31

The method of any of Embodiments 17 to 31, further comprising integrating the sensed signals at a charge-to-voltage converter configured to output a measurable voltage responsive to the integrated sensed signals.

Embodiment 32

The method of any of Embodiments 17 to 32, wherein the at least one channel capacitance is a channel capacitance measurement of the at least one channel.

Embodiment 33

A digital controller, comprising: a touch acquisition unit; a touch processor, responsive to measurable signals, wherein each measurable signal is indicative of sensed signals acquired in parallel at the touch acquisition unit from active sense channels of a touch sensor, configured to: determine a relative contribution of each of the sensed signals to measurable signals; and identify one or more of the sensed signals responsive to the determined relative contributions of each of the sensed signals.

Embodiment 34

The digital controller of Embodiment 33, wherein identifying a sensed signal comprises identifying a sensed signal corresponding to the greatest relative contribution of the determined relative contributions.

Embodiment 35

The digital controller of Embodiment 33 or 34, wherein the touch processor is configured to identify occurrence of one or more contact events at one or more sense channels of the active sensed channels corresponding to the one or more identified sensed signals.

Embodiment 36

The digital controller of any of Embodiment 33 to 35, further comprising an input/output (I/O) interface, wherein the touch processor is configured to provide information indicative of the one or more contact events at the I/O interface.

Embodiment 37

The digital controller of any of Embodiments 33 to 36, wherein the I/O interface is operably coupled to a data bus.

Embodiment 38

The digital controller of any of Embodiments 33 to 37, wherein the data bus is a peripheral data bus.

Embodiment 39

The digital controller of any of Embodiments 33 to 38, wherein the data bus is selected from the group consisting of a universal asynchronous receiver-transmitter (UART), a universal synchronous/asynchronous receiver-transmitter USART, and an inter-integrated circuit ($I^2C$).

Embodiment 40

The digital controller of any of Embodiments 33 to 39, wherein the touch processor is further configured to provide an polarity code to an input/output (I/O) interface configured to assert one or more drive signals responsive to the polarity code.

Embodiment 41

The digital controller of any of Embodiments 33 to 40, wherein the touch processor is further configured to determine one or more channel capacitance measurements responsive to the measurable signals.

We claim:

1. A capacitive circuit system, comprising:
a sensor circuitry comprising drive lines and sense lines;
an acquisition circuitry operatively coupled to the sense lines; and
a digital logic circuitry configured to:
provide groups of drive signals to an interface operatively coupled to the drive lines of the sensor circuitry, wherein the groups of drive signals comprise polarity changes and the groups of drive signals are associated with a number of drive lines;
select active sense lines of the sensor circuitry; and
determine at least one channel capacitance of at least one active sense line responsive to one or more sample voltages and the polarity changes.

2. The capacitive circuit system of claim 1, wherein the digital logic circuitry is configured to provide the groups of drive signals for a number of acquisition cycles.

3. The capacitive circuit system of claim 2, wherein each group of the groups of drive signals is associated with a different acquisition cycle of the number of acquisition cycles.

4. The capacitive circuit system of claim 1, wherein each of the polarity changes is selected from the group consisting of a low-to-high polarity change and a high-to-low polarity change.

5. The capacitive circuit system of claim 1, wherein the number of drive lines is a subset of the drive lines of the sensing circuitry.

6. The capacitive circuit system of claim 1, wherein the number of drive lines is all of the drive lines of the sensing circuitry.

7. The capacitive circuit system of claim 1, wherein a number of groups of drive signals is equal to a number of acquisition cycles over which the one or more sample voltages are received.

8. The capacitive circuit system of claim 1, further comprising selection circuitry configured to selectively couple selected sense lines to the acquisition circuitry responsive to selection by the digital logic circuitry.

9. The capacitive circuit system of claim 1, further comprising selection circuitry, wherein the selection circuitry further comprises switches configured for selectively coupling, wherein the switches are selected from the group consisting of bipolar-junction-transistors, diodes, capacitive switches, metal oxide semiconductor field effect transistors, and insulated gate bipolar transistors.

10. The capacitive circuit system of claim 1, wherein the acquisition circuitry comprises charge-to-voltage converter circuitry.

11. A capacitive circuit system, comprising:
a sensor circuitry comprising drive lines and sense lines;
an acquisition circuitry operatively coupled to the sense lines; and
a digital logic circuitry configured to:
provide groups of drive signals to an interface operatively coupled to the drive lines of the sensor circuitry,
wherein the groups of drive signals are associated with a number of drive lines, and
wherein a first group of drive signals associated with a first acquisition cycle comprises first drive signals, and one drive signal of the first drive signals comprises a first polarity change and all other drive signals of the first drive signals comprise a second polarity change,
select active sense lines of the sensor circuitry; and
determine at least one channel capacitance of at least one active sense line responsive to one or more sample voltages and the polarity changes.

12. The capacitive circuit system of claim 11, wherein the one drive signal of the first group of drive signals is associated with a first drive line of the number of drive lines.

13. The capacitive circuit system of claim 11, wherein a second group of drive signals associated with a second acquisition cycle comprises second drive signals, and one drive signal of the second drive signals comprises the first polarity change and all other drive signals of the drive signals comprise the second polarity change.

14. The capacitive circuit system of claim 13, wherein the one drive signal of the second drive signals is associated with a second drive line of the number of drive lines.

15. The capacitive circuit system of claim 14, wherein the first acquisition cycle and the second acquisition cycle are consecutive.

16. A method of capacitive sensing, comprising:
asserting, at a number of drive lines of a sensor circuitry, groups of drive signals comprising polarity changes;
enabling reception of sensed signals from sense lines of the sensor circuitry while the groups of drive signals are asserted;
receiving one or more sample voltages indicative of the sensed signals; and
determining at least one channel capacitance of at least one of the sense lines responsive to the one or more sample voltages.

17. The method of claim 16, further comprising asserting the groups of drive signals over a number of acquisition cycles.

18. The method of claim 17, further comprising asserting each group of the groups of drive signals a different acquisition cycle of the number of acquisition cycles.

19. The method of claim 16, wherein each of the polarity changes is selected from a group consisting of a low-to-high signal change and a high-to-low signal change.

20. The method of claim 16, further comprising asserting the groups of drive signals at a subset of the number of drive lines of the sensing circuitry.

21. The method of claim 16, further comprising asserting the groups of drive signals at all of the number of drive lines of the sensing circuitry.

22. The method of claim 16, further comprising asserting drive signals of all of the groups over a number of acquisition cycles equal to the number of groups.

23. The method claim 16, further comprising selectively coupling selected sense lines to an acquisition circuitry.

24. The method of claim 23, further comprising selectively enabling or disabling switches to selectively couple the selected sense lines to the acquisition circuitry, wherein the switches are selected from the group consisting of bipolar-junction-transistors, diodes, capacitive switches, metal oxide semiconductor field effect transistors, and insulated gate bipolar transistors.

25. The method of claim 16, further comprising integrating the sensed signals at a charge-to-voltage converter configured to output a measurable voltage responsive to the integrated sensed signals.

26. A method of capacitive sensing, comprising:
asserting, at a number of drive lines of a sensor circuitry, groups of drive signals comprising polarity changes, wherein the asserting the groups of drive signals comprises:
asserting first drive signals during a first acquisition cycle, wherein one drive signal of the first drive signals comprises a first polarity change and all other drive signals of the drive signals comprise a second polarity change;
enabling reception of sensed signals from sense lines of the sensor circuitry while the groups of drive signals are asserted;
receiving one or more sample voltages indicative of the sensed signals; and
determining at least one channel capacitance of at least one of the sense lines responsive to the one or more sample voltages,
further comprising asserting first drive signals during a first acquisition cycle, wherein one drive signal of the first drive signals comprises a first polarity change and all other drive signals of the drive signals comprise a second polarity change.

27. The method of claim 26, further comprising asserting the one drive signal of the first drive signals at a first drive line of the number of drive lines.

28. The method of claim 26, further comprising asserting second drive signals during a second acquisition cycle, wherein one drive signal of the second drive signals comprises the first polarity change and all other drive signals of the drive signals comprise the second polarity change.

29. The method of claim 28, wherein the one drive signal of the second drive signals is asserted at a second drive line of the number of drive lines.

30. The method of claim 29, wherein the first acquisition cycle and the second acquisition cycle are consecutive.

31. A digital controller, comprising:
a touch acquisition unit;
an input/output (I/O) interface;
a touch processor, responsive to measurable signals, wherein each measureable signal is indicative of sensed signals acquired in parallel at the touch acquisition unit from active sense channels of a touch sensor, configured to:
determine a relative contribution of each of the sensed signals to measurable signals;
identify one or more of the sensed signals responsive to the determined relative contributions of each of the sensed signals;
identify an occurrence of one or more contact events at one or more sense channels of the active sensed channels corresponding to the one or more identified sensed signals; and
provide information indicative of the one or more contact events at the I/O interface.

32. The digital controller of claim 31, wherein the I/O interface is operably coupled to a data bus.

33. The digital controller of claim 32, wherein the data bus is a peripheral data bus.

34. The digital controller of claim 32, wherein the data bus is selected from the group consisting of a universal asynchronous receiver-transmitter (UART), a universal synchronous/asynchronous receiver-transmitter USART, and an inter-integrated circuit ($I^2C$).

35. The digital controller of claim 31, wherein the touch processor is further configured to provide an polarity code to an input/output (I/O) interface configured to assert one or more drive signals responsive to the polarity code.

36. The digital controller of claim 31, wherein the touch processor is further configured to determine one or more channel capacitance measurements responsive to the measurable signals.

* * * * *